(12) United States Patent
Neumeier et al.

(10) Patent No.: US 7,273,763 B1
(45) Date of Patent: Sep. 25, 2007

(54) METHOD OF PRODUCING A MICRO-ELECTROMECHANICAL ELEMENT

(75) Inventors: Karl Neumeier, Unterhaching (DE); Dieter Bollmann, Munich (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 09/868,156

(22) PCT Filed: Sep. 29, 1999

(86) PCT No.: PCT/EP99/07204

§ 371 (c)(1),
(2), (4) Date: Sep. 14, 2001

(87) PCT Pub. No.: WO00/36387

PCT Pub. Date: Jun. 22, 2000

(30) Foreign Application Priority Data

Dec. 15, 1998 (DE) ................. 198 57 741
Jun. 18, 1999 (DE) ................. 199 27 970

(51) Int. Cl.
*H01L 21/00* (2006.01)
(52) U.S. Cl. .............. 438/52; 438/53; 438/51
(58) Field of Classification Search .......... 438/52, 438/53, 51
See application file for complete search history.

(56) References Cited

U.S. PATENT DOCUMENTS

| | | | |
|---|---|---|---|
| 3,909,924 A * | 10/1975 | Vindasius et al. ........... 438/17 |
| 4,203,128 A | 5/1980 | Guckel et al. ............... 357/60 |
| 4,586,109 A | 4/1986 | Peters et al. | |
| 4,996,627 A * | 2/1991 | Zias et al. .............. 361/283.4 |
| 5,177,661 A * | 1/1993 | Zavracky et al. ........ 361/283.4 |
| 5,488,869 A | 2/1996 | Renaud ....................... 73/724 |
| 5,600,072 A | 2/1997 | Chen et al. .................. 73/724 |
| 5,719,069 A | 2/1998 | Sparks | |
| 5,744,725 A | 4/1998 | Chen et al. .................. 73/724 |
| 5,744,752 A | 4/1998 | McHerron et al. | |

(Continued)

FOREIGN PATENT DOCUMENTS

DE          3743080          12/1987

(Continued)

*Primary Examiner*—Thao P. Le
(74) *Attorney, Agent, or Firm*—Michael A. Glenn; Glenn Patent Group

(57) ABSTRACT

In a method of producing a micro-electromechanical element a first intermediate layer, which is applied to a first main surface of a first semiconductor wafer, is structured in a first step so as to produce a recess. The first semiconductor wafer is connected via the first intermediate layer to a second semiconductor wafer in such a way that a hermetically sealed cavity is defined by the recess. When one of the wafers has been thinned from a surface facing away from said first intermediate layer so as to produce a diaphragm-like structure on top of the cavity, electronic components are produced in said thinned semiconductor wafer making use of standard semiconductor processes. At least one further intermediate layer between the two semiconductor wafers is provided, which, prior to the connection of the two semiconductor wafers, is structured in such a way that the structure formed in said at least one further intermediate layer and the recess in said first intermediate layer define the cavity. Finally at least one defined opening is produced so as to provide access to the hermetically sealed cavity.

10 Claims, 2 Drawing Sheets

U.S. PATENT DOCUMENTS 5,969,591 A * 10/1999 Fung ........................... 338/42
6,374,680 B1 * 4/2002 Drewes et al. ................ 73/718
6,431,003 B1 * 8/2002 Stark et al. ................... 73/718
6,465,271 B1 * 10/2002 Ko et al. ...................... 438/48
6,518,084 B1 * 2/2003 Seitz et al. ................... 438/53

FOREIGN PATENT DOCUMENTS

| | | |
|---|---|---|
| DE | 19543893 | 11/1995 |
| DE | 195 34 137 | 3/1997 |
| DE | 19913612 | 3/1999 |
| EP | 610 806 | 2/1993 |
| WO | 94/17383 | 4/1994 |
| WO | WO96/18872 | 9/1996 |

* cited by examiner a)

b)

c)

METHOD OF PRODUCING A MICRO-ELECTROMECHANICAL ELEMENT

CROSS-REFERENCE TO RELATED APPLICATIONS

This application is a 371 of PCT/EP99/0724, filed Sep. 29, 1999, which claims priority to German applications 19857741.9, filed Dec. 15, 1998 and 19927970.5, filed Jun. 18, 1999, each of which is incorporated herein in its entirety by this reference thereto.

BACKGROUND OF THE INVENTION

1. Field of the Invention

The present invention relates to a method of producing a micro-electromechanical element, and, more specifically, to a micro-electromechanical element which is implemented such that a micromechanical structure and electronic components are arranged in the same semiconductor wafer.

2. Description of Prior Art

Due to the fast development in the field of semiconductor industry and microelectronics, micromechanical elements, e.g. silicon-based micromechanical pressure measurement cells, replace classical mechanical pressure transducers more and more. Micromechanical elements are used in great amounts e.g. in the fields of automation technology and medical engineering as well as in automotive vehicles. The systems preferably used in this connection are micro-electromechanical integrated systems which realize the combination of mechanical and electronic functions on one substrate. In addition to the electronic components produced in CMOS or similar technologies, which are e.g. measuring transducers, amplifiers, storage means, microcontrollers, etc., mechanical components exist in the same layers. These mechanical components may e.g. be diaphragms of pressure sensors, elastic sheets of valves or pumps, oscillating masses of acceleration sensors, movable fingers or cantilevered arms of switches and the like. In addition to the more or less smooth surface which normally exists in the field of planar technology, these mechanical structures have a three-dimensional structural design and comprise cantilevered structures and buried cavities.

Up to now, it has been known to produce such cavities by wet-chemical etching or by connecting two disks which have been fully processed individually in advance. The techniques which may be used as a connection technique for connecting the individually processed disks are wafer bonding (silicon fusion bonding), anodic bonding or glueing. In any case, the individual disks are fully processed before they are connected in accordance with conventional methods, so that processing steps which may impair the mechanical structures need not be carried out afterwards.

When a wet-chemical undercutting of structures is carried out, the so-called "sticking" problem arises in the case of which the cantilevered structure will adhere to the neighbouring surface due to capillary forces occurring when the liquid dries; hence, the cantilevered structure will lose its movability. Small ditches, holes and gaps additionally cause problems when the structure in question is to be wetted with liquids (e.g. etching solutions, cleaning water, photoresist) and during the removal of these liquids, the problems being then caused e.g. by bubbles which may adhere to the structure in corners thereof. In the case of spinning, drops may remain, which will cause marks when they dry up. Cleaning by means of brushes is problematic as well, since the movable structures may break off during such cleaning processes. A clean surface of the structures is, however, necessary so that the production methods for producing the evaluation structures, such as a CMOS method, can be applied. Due to the risk of carrying over particles and contaminations, the CMOS ability may no longer be given in the case of open structures, i.e. certain sequences of process steps are not allowed in an CMOS line. In addition, when the chips comprised in the wafer are diced by means of a wafer saw, water is used as a rinsing liquid, which may penetrate into open cavities thus aggravating the particle and contamination problem.

It is additionally known to produce diaphragm-like structures making use of KOH back etching, when the electronic components on the front surface of a wafer have been finished. Due to the oblique etch edges occurring in the case of KOH etching, the integration level will, however, decrease substantially when this method is used, especially when a high number of micro-electromechanical components is produced from one wafer.

Various methods of producing semiconductor pressure sensors are additionally described in DE 3743080 A1.

DE-C-19543893 describes a method of aligning structures which are to be produced in a substrate, in the case of which a diaphragm-like structure is formed on top of a cavity. For this purpose, a closed cavity is first produced between two substrates by forming a recess in a masking layer on one of the substrates, whereupon the two substrates are interconnected via the masking layer and one of the substrates is thinned in a final step.

U.S. Pat. No. 4,586,109 describes a method of producing a capacitive pressure sensor. For this purpose, a layer arranged on a substrate is first structured so that a closed cavity will be formed, when the substrate has been connected via this layer to a further substrate. This cavity can then be opened through one of the substrates for producing a relative pressure sensor.

EP-A-639761 discloses a method of producing a differential pressure sensor in the case of which a substrate structure, in which a micromechanical element is formed, is connected to a glass substrate.

SUMMARY OF THE INVENTION

It is the object of the present invention to provide methods of producing micro-electromechanical elements, which permit the use of conventional standard semiconductor production processes for producing electronic components in the wafer in which micromechanical elements are formed as well, the methods permitting the production of micro-electromechanical elements with a high yield and the micromechanical elements produced being adapted to be used in a flexible manner.

According to a first aspect of the invention, this object is achieved by a method of producing a micro-electromechanical element comprising the following steps:

structuring a first intermediate layer, which is applied to a first main surface of a first semiconductor wafer, so as to produce a recess;

connecting the first semiconductor wafer via the first intermediate layer to a second semiconductor wafer in such a way that a hermetically sealed cavity is defined by the recess;

thinning one of the wafers from a surface facing away from said first intermediate layer so as to produce a diaphragm-like structure on top of the cavity;

producing electronic components in said thinned semiconductor wafer;

providing at least one further intermediate layer between the two semiconductor wafers, which, prior to the connection of the two semiconductor wafers, is structured, in such a way that the structure formed in said at least one further intermediate layer and the recess in said first intermediate layer define the cavity; and producing at least one defined opening so as to provide access to the hermetically sealed cavity.

According to a second aspect of the invention, this object is achieved by a method of producing a micro-electromechanical element comprising the following steps:

structuring a first intermediate layer, which is applied to a first main surface of a first semiconductor wafer, so as to produce a recess;

connecting the first semiconductor wafer via the first intermediate layer to a second semiconductor wafer in such a way that a hermetically sealed cavity is defined by the recess;

thinning one of the wafers from a surface facing away from said first intermediate layer so as to produce a diaphragm-like structure on top of the cavity; and producing electronic components in said thinned semiconductor wafer; and dicing a plurality of micro-electromechanical structures, which are formed in a wafer according to the above steps, so as to obtain chips, a defined opening, which provides access to the hermetically sealed cavities being produced by the dicing step.

According to a third aspect of the invention, this object is achieved by a method of producing a micro-electromechanical element comprising the following steps:

structuring a first intermediate layer, which is applied to a first main surface of a first semiconductor wafer, so as to produce a recess;

connecting the first semiconductor wafer via the first intermediate layer to a second semiconductor wafer in such a way that a hermetically sealed cavity is defined by the recess;

thinning one of the wafers from a surface facing away from said first intermediate layer so as to produce a diaphragm-like structure on top of the cavity;

producing electronic components in said thinned semiconductor wafer;

wherein in the step of structuring the intermediate layer the intermediate layer is structured in such a way that, when the two wafers have been connected, at least two hermetically sealed cavities are defined, which are interconnected by a channel, a respective diaphragm-like structure being arranged on top of each of said cavities after the step of thinning one of the wafers, and wherein the method additionally comprises the step of opening a defined opening through the diaphragm-like structure on top of one of the cavities.

According to a fourth aspect of the invention, this object is achieved by a method of producing a micro-electromechanical element comprising the following steps:

structuring a first intermediate layer, which is applied to a first main surface of a first semiconductor wafer, so as to produce a recess;

connecting the first semiconductor wafer via the first intermediate layer to a second semiconductor wafer in such a way that a hermetically sealed cavity is defined by the recess;

thinning one of the wafers from a surface facing away from said first intermediate layer so as to produce a diaphragm-like structure on top of the cavity;

producing electronic components in said thinned semiconductor wafer; and producing a plurality of defined openings in the diaphragm-like structure in such a way that, when said openings have been produced, the diaphragm-like structure forms a supporting structure for the movable mass of an acceleration sensor.

It follows that, according to the present invention, the cavity which, together with the diaphragm-like structure, defines a micromechanical element will always remain hermetically sealed until the electronic components, e.g. an integrated circuit, have been finished so that the above-described problems entailed by the use of e.g. an CMOS method for producing an integrated circuit will not arise when the method according to the present invention is used. In addition, due to the hermetically sealed cavity, the above-mentioned problems of removing the etching liquids from the cavities will not arise, since due to the fact that the cavities are hermetically sealed, it is impossible that media, such as liquids, gases, solids and the like, penetrate into the respective cavity during the production of the integrated circuit. It follows that the method according to the present invention permits micro-electromechanical elements, e.g. pressure sensors or controlled valves, to be produced by a reduced number of processing steps so that production at a reasonable price is made possible by the present invention.

According to the present invention, these advantages are achieved in that a hermetically sealed cavity is formed in an intermediate layer which is used for connecting two semiconductor wafers. According to preferred embodiments of the present invention, both semiconductor wafers have an intermediate layer applied thereto, one or both of these intermediate layers being structured so as to form the cavity after the connecting step; the intermediate layers are insulating or conductive layers which may consist e.g. of oxide (thermal or TEOS), polysilicon, nitride or metal. These intermediate layers can be interconnected by means of known connection methods, e.g. wafer bonding (silicon fusion bonding), anodic bonding or by means of an adhesive. Alternatively, a larger number of intermediate layers can be used between the wafers to be connected so as to permit the production of a cavity with areas of variable height.

For opening the hermetically sealed cavity, a great number of methods can be used; according to preferred embodiments of the present invention, access to the cavity is realized by producing a defined opening in the diaphragm-like structure, since an access to the cavity can be produced in this way without major effort. The opening in the diaphragm-like structure can be defined by means of a multiplicity of methods, e.g. by making use of a needle or a blade, by making use of a pulsed laser radiation or by means of etching methods. When the method according to the present invention is used for producing in a wafer a plurality of micro-electromechanical elements, which are subsequently diced, access to the previously hermetically sealed cavity can be provided by the dicing step; this can be done by structuring a channel when the intermediate layer or the plurality of intermediate layers is being structured, this channel extending up to the boundary surface at which the dicing will be carried out subsequently.

The method according to the present invention is particularly suitable for producing pressure sensors or acceleration sensors; it is, however, also suitable for producing fluid systems which, together with sensors, actors and/or evaluation logics, are realized as a microsystem.

In order to produce a differential pressure sensor, at least two cavities which are hermetically sealed from their surroundings are produced according to the present invention in the intermediate layer or intermediate layers arranged between the wafers, these cavities being interconnected by a channel and the diaphragm-like structure arranged on top of one of these cavities being then provided with an opening so that, via this opening, a pressure can be applied to the lower surface of the unopened diaphragm-like structure, so that the differential pressure between the upper surface and the lower surface of this diaphragm can be detected.

The ratio of the cavity volume to the flow resistance of the connection channel can be varied within wide limits in such a way that the response time, i.e. the time constant, of the sensor will be in a desired range. A variometer for use in aerial navigation can e.g. be realized in this way.

Furthermore, the method according to the present invention is suitable for producing acceleration sensors; in this case, a plurality of openings is realized in the diaphragm-like structure in such a way that the diaphragm-like structure defines a supporting structure for the movable mass.

Further developments of the present invention are specified in the dependent claims.

BRIEF DESCRIPTION OF THE DRAWINGS

In the following, preferred embodiments of the present invention will be explained in detail making reference to the drawings enclosed, in which.

DESCRIPTION OF PREFERRED EMBODIMENTS OF THE INVENTION

Figure 1:
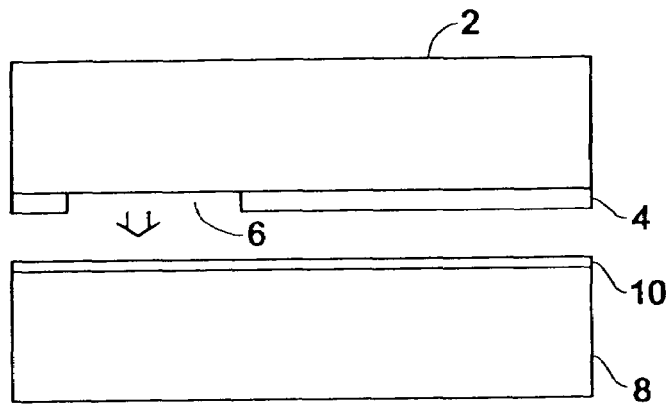
FIG. 1a) to 1c) show schematic cross-sectional views for explaining an embodiment of the method according to the present invention.
Figure 1:
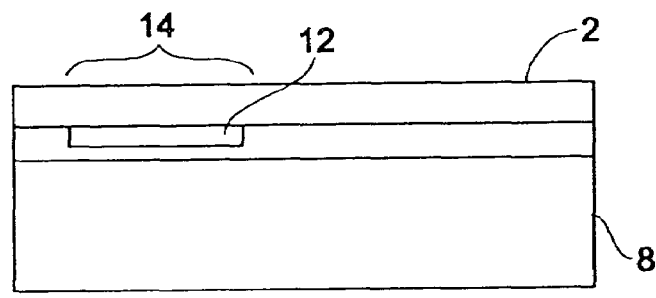
Figure 1:
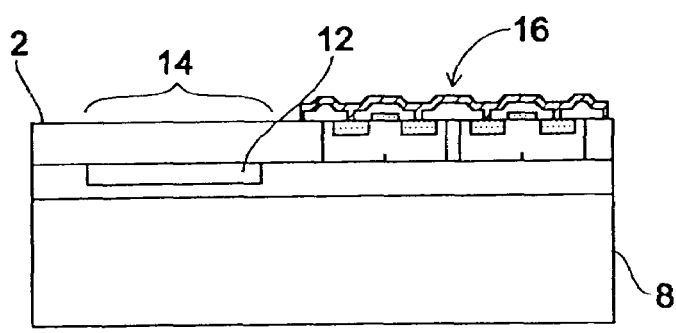

Making reference to FIG. 1, the steps for producing the micromechanical element and the electronic components of a micro-electromechanical element are first described, all the cavities of the micromechanical element being hermetically sealed until the method shown in FIG. 1a) to 1c) has been finished.

As can be seen in FIG. 1a), an intermediate layer 4, which is applied to a first semiconductor wafer 2, is first structured so as to form a recess 6 therein. Subsequently, the semiconductor wafer 2 is connected via the intermediate layer 4 to a second semiconductor wafer 8 which, in the case of the embodiment shown, is also provided with an intermediate layer 10. Due to the connection of the two wafers 2 and 8, a hermetically sealed cavity 12 is defined by the recess 6, as can be seen in FIG. 1b). When the two wafers 2 and 8 have been connected, the first wafer 2 is thinned from its main surface facing away from the wafer 8 so as to produce a diaphragm-like structure 14 on top of the cavity 12. In the course of this process, the cavity 12 defined in the intermediate layer 4 remains hermetically sealed.

FIG. 1b) shows the micromechanical structure produced; the production method of this micromechanical structure permits integrated circuit structures 16 to be produced in the thinned wafer 2 by means of conventional standard semiconductor processes, the thinned wafer 2 having the diaphragm-like structure 14 formed therein; these integrated circuit structures can be used for evaluating signals that have been produced by the diaphragm 14. The micromechanical structure becomes in this way the micro-electromechanical structure shown in FIG. 1c) in the case of which a semiconductor wafer 2 has formed therein a micromechanically produced diaphragm 14 as well as an integrated circuit 16 which has been produced e.g. by conventional CMOS techniques. The method according to the present invention permits this production of a micro-electromechanical element making use of conventional standard semiconductor production processes, e.g. CMOS processes, since the cavity 12 always remains hermetically sealed until the integrated circuit has been finished. Hence, the present invention permits an economy-priced production of micro-electromechanical elements by means of a—in comparison with conventional methods—reduced number of method steps.

The material used for the semiconductor wafers in the method according to the present invention is preferably silicon, the intermediate layer or the intermediate layers 4 and 10 in FIG. 1 consisting preferably of an oxide, polysilicon, a nitride or metal. In this respect, it should be pointed out that, although an intermediate layer is arranged on both wafers of the above-described embodiment, the method according to the present invention requires only one intermediate layer in which the recess is structured. According to alternative embodiments, a plurality of intermediate layers can be provided between the wafers so that it will be possible to produce cavities with areas of different heights by structuring the individual layers differently. Alternatively to the method shown in FIG. 1, it would also be possible to provide a structure also in the intermediate layer 10 applied to the second substrate 8, so that this structure will, together with the structure provided in the intermediate layer 4, define the cavity when the wafers have been connected. Reference should be made to the fact that a quasi-unlimited possibility of structuring intermediate layers for producing different cavities exists as long as the cavities are hermetically sealed after the connection of the two wafers. The structuring for producing these cavities can be carried out by means of known structuring techniques, e.g. photolithography and wet etching or dry etching, or by means of selective deposition.

The wafers can be connected by means of known connection methods; the two wafers are placed one on top of the other such that they are in contact via the connection layer or connection layers, and interconnected by means of special processes, e.g. anodic bonding processes, adhesive processes or the so-called silicon fusion bonding. When this connection has been established, a hermetically sealed cavity 12 is formed by the recess or the recesses which have initially been structured in the intermediate layer or in the intermediate layers, this cavity being shown in FIG. 1b). Subsequently, one of the two semiconductor wafers is thinned to a predetermined thickness so that a diaphragm-like structure is formed on top of the cavity. The wafer to be thinned can preferably consist of an SOI material (silicon on insulator), which will facilitate exact thinning. By means of this thinning, a sensor-specific zone or diaphragm is produced on top of the structured areas, i.e. on top of the cavities, whereas the residual area of the thinned wafer can be used for the integration of electronic circuits.

The mechanical structures produced according to this method—one of these structures being shown in FIG. 1b) by way of example—still have a planar surface which is closed at the top and below this surface one or a plurality of hermetically sealed cavities. Hence, the thinned wafer can be processed by the conventional CMOS technologies.

The shape of these hermetically sealed cavities has an arbitrary plan area, in the simplest case rectangular, polygonal or round, and it may comprise elongate and convolute channels or it may consist of a plurality of isolated structures or structures which are connected with channels. The height of the cavities is given by the thickness of the structured layer, as can be seen in FIG. 1a; hence, this height will be uniform in the simplest case. As has already been mentioned hereinbefore, the height of the cavities can, however, be varied in an arbitrary manner by structuring a single layer more than once or by structuring several layers, i.e. cavities with areas of different heights can be produced.

In accordance with preferred embodiments of the method according to the present invention, the step of connecting the two wafers is carried out in a vacuum so that in the case of high-temperature processes which may perhaps be carried out later on no excess pressure will result from the thermal expansion of a gas contained in the hermetically sealed cavities. This will prevent the diaphragm-like structures produced on top of the cavity or cavities from being damaged, since it is easier to resist e.g. a negative pressure of 1 bar in the cold condition, which exists e.g. in the case of a vacuum in the cavity, than an excess pressure of 3 bar in a diffusion furnace at e.g. 1100° C., when the connection of the wafer does not take place in a vacuum. Depending on the respective use of the micromechanical structure produced according to the present invention it is, however, also possible to fill the cavity with a special gas at an arbitrary pressure.

According to the present invention, at least one defined opening is produced, when the method shown in FIG. 1a) to 1c) has been finished, so as to provide access to the hermetically sealed cavity. A differential pressure sensor or, alternatively, an acceleration sensor can thus be realized by the element shown in FIG. 1c), when the openings in the diaphragm-like area 14 are e.g. defined in such a way that they define a supporting structure for a movable mass.

When the method steps shown in FIG. 1a) to 1c) have been finished, the cavity or the cavities according to the present invention are opened at predetermined locations. This opening of the cavities can take place in a vacuum chamber, in the ambient air, in a protective gas, in a special atmosphere or under a liquid. In any case, the medium in question will penetrate into the cavity and fill it completely, when the cavity was under a vacuum before, i.e. when the wafer-connecting step has taken place in a vacuum, as has been explained hereinbefore.

The opening of the cavity can be realized in different ways. For producing a differential pressure sensor, which production will be explained in detail in the following making reference to FIGS. 2 and 3, the diaphragm-like structure arranged on top of one of the cavities can e.g. be opened by puncturing by means of a needle or a blade. In order to prevent the fragments which are likely to be produced from penetrating into neighbouring cavities, the channels interconnecting the cavities may be implemented after the fashion of a labyrinth. Alternatively, it is also possible to open the diaphragm-like structure on top of one of the cavities by means of a pulsed laser radiation. In the case of this method fragments and possible microcracks are avoided so that the reliability will not be endangered. Furthermore, the vapours and molten droplets produced can be rendered harmless by providing the channels with a suitable structural design. These two methods for opening the cavities are suitable for chips which have already been sawn, diced and perhaps mounted in a housing. When the cavities have been opened, the tubules used for connection to the pressure-carrying medium are mounted when the component in question is a pressure sensor.

Normally, a plurality of micro-electromechanical elements are formed in a wafer, which are then diced so as to obtain individual chips. The opening of the cavities can then take place during the sawing of the wafers, when the channels have been implemented such that they extend down to the scratch frame defining the saw paths. The channels are then accessible from the lateral surfaces of the chips, and this can be advantageous for the mounting operation. The ingress of cooling water can be avoided by dry sawing, by scribing and breaking or by cutting with pulsed laser radiation.

The cavities can also be opened by purposeful etching, e.g. in a plasma etcher. In this case, the surface of the wafer and, consequently, the diaphragm-like structure have applied thereto a protective layer, e.g. a passivation layer or a photoresist, which is has apertures at the locations at which the opening or the openings are to be formed. At these locations the diaphragm is etched away, whereas it is preserved at the protected locations. In contrast to liquids, the gas penetrating in the course of this process does not cause any problems in the cavities. The passivation can remain on the component after this etching step, whereas the photoresist can be removed by incineration in plasma. This etching method can be carried out prior to dicing of the chips for a plurality of elements comprised in the wafer or after the dicing of the chips.

Making reference to FIGS. 2 and 3, a preferred embodiment of the method of producing a differential pressure sensor according to the present invention will be described in the following. Micromechanically integrated pressure sensors measure an externally applied pressure of a gas or of a liquid and process this pressure so as to obtain an electric signal. Normally, these sensors are implemented as absolute pressure sensors. Such a sensor may e.g. have the structural design shown in FIG. 1c), in the case of which a thin layer is located on top of a hermetically sealed cavity, this layer acting after the principle of an aneroid barometer as a diaphragm. In order to be as independent as possible of temperature variations of the surroundings, the cavity is normally empty, i.e. it is under a vacuum.

Frequently, it is desired to compare the pressure of two volumes; in this case, only the pressure difference is of interest. The pressure difference to be measured is often very small in comparison with the absolute pressure. Hence, the measuring accuracy would be very low if the measurement were carried out by forming the difference between the measured values of two absolute pressure sensors. It will be more advantageous to connect the diaphragm on either side thereof to the volumes to be measured and to measure only the pressure difference. In the case of macroscopic sensors with diaphragms of metal or rubber such a sensor can be realized easily. In the case of microelectronically integrated sensors, however, the two sides of the diaphragm are no longer symmetrical. In planar technology there is always an upper side which is exposed to the technological processes and which is easy to clean and a lower side which is protected against aggressive gases and liquids during the production process. In order to permit the wafers to be processed by conventional standard semiconductor processes, e.g. CMOS technologies, they must have a planar surface which is closed at the top. This is made possible by the method according to the present invention, this method permitting thus micromechanical elements and electronic components, which have been formed making use of conventional semiconductor processes, to be integrated in a wafer.

Figure 2:
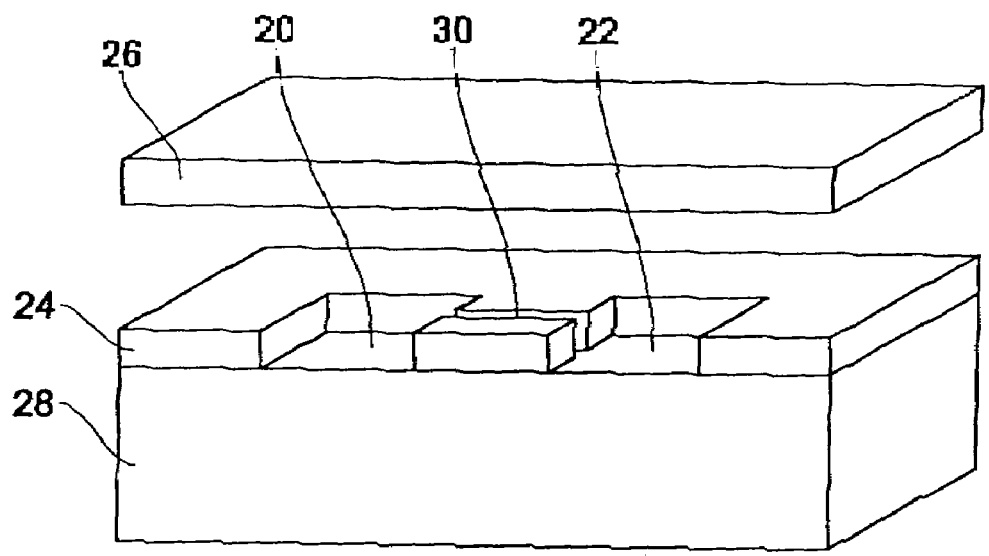
FIG. 2 shows schematically an exploded view for illustrating an embodiment of the method of producing a differential pressure sensor according to the present invention.

As can be seen in the schematic exploded view of FIG. 2, two cavities 20 and 22 are produced in an intermediate layer 24, which is formed between two wafers 26 and 28, so as to produce a differential pressure sensor. The two cavities are interconnected by a channel 30 which is defined in the intermediate layer 24. It is evident that FIG. 2 shows the state of the process which is shown in FIG. 1b) for a single cavity, the upper wafer 26 being shown separately from the intermediate layer 24 only for the sake of clarity, so that the cavities 20 and 22 as well as the channel 30 formed in the intermediate layer 24 are hermetically sealed from the surroundings.

In this connection, it should also be pointed out that the cavities and the channel may also be structured in plurality of intermediate layers so as to be able to define areas of different heights or so as to produce predetermined breaking points for the future opening step. In the schematic representation of FIG. 2, the upper wafer 26 has already been thinned so that diaphragm-like structures 32 and 34, FIG. 3, are formed on top of the cavities 20 and 22, the outlines of these diaphragm-like structures being indicated by broken lines in FIG. 3. When the structure shown in FIG. 2 has been produced, the diaphragm 34 arranged on top of the cavity 22 has formed on opening 36 therein, which defines an access to the cavity 22 and, consequently, via the channel 30 also to the cavity 20. In this connection, it should be pointed out that the opening is not formed in the diaphragm 34 until the semiconductor production, i.e. the production of electronic components, e.g. in the form of an evaluation unit, in the semiconductor wafer 26 has been finished. For this semiconductor production conventional standard semiconductor processes, e.g. CMOS processes, can be used, since all the cavities are hermetically sealed at the time of the semiconductor production. Furthermore, reference should be made to the fact that the electronic components are not shown in FIG. 3.

Figure 3:
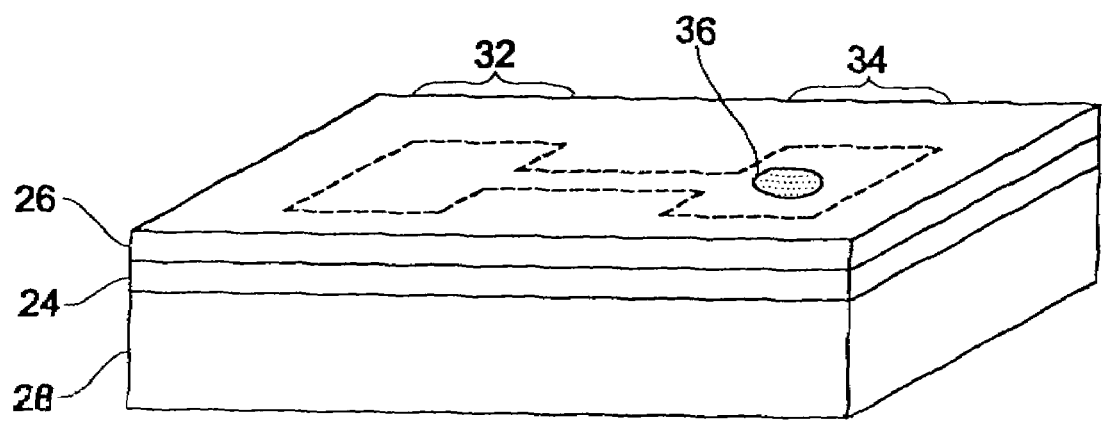
FIG. 3 shows a schematic representation for further explaining the embodiment of the method of producing a differential pressure sensor according to the present invention.

The micromechanical element shown in FIG. 3 can serve as a differential pressure sensor, since a first pressure can act on the upper surface of the diaphragm 32, whereas a second pressure can act on the lower surface thereof via the opening 36, the cavity 22, the channel 30 and the cavity 20 so that the output signal of the sensor defined by the diaphragm 32 and the cavity 20 will be representative of the difference between these two pressures. In order to permit this, the build-up and connection technique can comprise the step of connecting the sensor, i.e. the diaphragm 32 and the open second cavity 22, to a respective gas volume e.g. by means of glued-on small tubes. Since the second cavity 22 communicates through the channel 30 with the lower surface of the diaphragm 32 through gas exchange, the pressure applied here acts on the lower surface of the diaphragm 32. Hence, the sensor will register the differential pressure between the two connections. Both connections can be mounted from the upper side of the sensor, whereby the structural design can be simplified.

Alternatively, it is possible to implement the pressure sensor, which is defined by the diaphragm 32 and the cavity 20, as well as the channel and the second cavity several times so as to produce e.g. a sensor array. The ratio of the cavity volume to the flow resistance of the connection channel can be varied within wide limits so that the sensor response time can be adjusted.

In addition to the above-described use of the method according to the present invention for producing differential pressure sensors, the method according to the present invention is also suitable for producing mechanically oscillatory sensors and actors; also in the case of these components it will be advantageous when the sensor and the associated evaluation electronics are integrated on the same chip. Such mechanically oscillatory sensors and actors are required e.g. in airbag trigger devices, accelerometers, tuning forks, rotary encoders, valves, pumps, switches and the like. A special feature required in this connection is an oscillating mass which is suspended from comparatively thin holders. These holder serve as elastic springs.

According to the present invention, such a holding structure for a movable mass can be produced e.g. by taking as a basis the structure which has been described as pressure sensor in FIG. 1c) and by providing the diaphragm-like area 14 with openings so as to define such a supporting structure. In this connection, it should be pointed out that during the semiconductor production, i.e. during the production of the evaluation circuit, a movable mass is attached to the diaphragm 14 or formed in this diaphragm 14 by structuring. It is obvious that the evaluation circuit shown in FIG. 1c) as an evaluation circuit 16 for a pressure sensor will have to be adapted to an acceleration sensor in a suitable manner. During the semiconductor production, the diaphragm-like area is completely connected to the surrounding area of the wafer in which the diaphragm-like area is formed so that the cavity below the diaphragm-like area is hermetically sealed.

As has already been explained hereinbefore, this method provides substantial advantages in the production process with respect to yield, mechanical robustness as well as protection against liquids. In order to make the mass movable at the end of the semiconductor production process in which the electronic components are produced, the diaphragm is removed at the boundary of the mass preferably by means of an etching process. The part of the diaphragm which is intended to be used as a holder is protected against the attack of the etchant and is preserved. In comparison with the abovementioned openings, e.g. of the cavity 22 in the case of the differential pressure sensor shown in FIGS. 2 and 3, the surface to be etched is large in the case of this application. Since the movable mass should be as big as possible, it will be advantageous to make it as thick as possible. Since the areas to be opened should, on the other hand, have the thinnest possible diaphragms so that they can be opened easily, it will be advantageous to structure a plurality of layers in different ways. This requires respective additional lithographic planes. The oscillating mass, which is obtained by the supporting structure produced in the manner described hereinbefore, can be produced from a multi-layer structure consisting of silicon, metal or oxide.

A further field of application which should be mentioned in connection with the method for producing micro-electromechanical structures according to the present invention are fluid systems. The chemical reaction vessels realized in macroscopic systems by glass tubes, glass bulbs as well as rubber hoses are implemented in a miniaturized form in silicon or in some other material which is suitable for microsystem technology in microfluid systems. The use comprises the dosage, mixing and physical measurement of small amounts of liquid and of the chemical and biological reactions thereof. The cavities, their connection channels as well as branches and connection openings are structured in one or in a plurality of intermediate layers, which are arranged between two wafers, according to the present invention. The cavities are then hermetically sealed by subsequently connecting the wafers, whereupon one of the wafers is thinned. This wafer has a planar upper surface and is therefore adapted to be processed by the conventional CMOS technologies so that electronic sensors, such as pressure sensors, temperature sensors, conductivity sensors or also photodiodes for light absorption, and actors, e.g. amplifiers, microcontrollers, electrodes and the like, can be built up in the immediate vicinity of the vessels. This integration of sensor, actor and logic on a substrate makes the component a microsystem. When the semiconductor production has been finished, the cavities provided for connection are opened at predetermined locations in accordance with the above-described methods and connected to the supply lines feeding the liquid.

It follows that the present invention permits the production of micro-electromechanical elements in the case of which all the cavities of the micromechanical structures of these micro-electromechanical elements are hermetically sealed after their production, and a planar surface which is closed at the top is provided so that the wafers can be processed from above making use of conventional CMOS technologies. The cavities are not opened until the electronic components have been finished. Problems entailed by conventional methods due to the cleaning of wafer surfaces and the ingress of liquids into cavities as well as due to the carrying over of particles and contaminations are therefore eliminated by the method according to the present invention. Hence, the present invention provides a method which requires little expenditure and which permits the production of micro-electromechanical elements at a reasonable price and with a high yield.

What is claimed is:

1. A method of producing a micro-electromechanical element comprising the following steps:
    a) structuring a first intermediate layer, which is applied to a first main surface of a first semiconductor wafer, so as to produce a recess;
    b) connecting the first semiconductor wafer via the first-intermediate layer to a second semiconductor wafer in such a way that a hermetically sealed cavity is defined by the recess;
    c) thinning one of the wafers from a surface facing away from said first intermediate layer so as to produce a diaphragm-like structure on top of the cavity;
    d) producing electronic components in said thinned semiconductor wafer;
       wherein in step a) the intermediate layer is structured in such a way that, when the two wafers have been connected, at least two hermetically sealed cavities are defined, which are interconnected by a channel, a respective diaphragm-like structure being arranged on top of each of said cavities after step c),
       and wherein the method additionally comprises the step e) of opening a defined opening through the diaphragm-like structure on top of one of the cavities.

2. A method according to claim 1, wherein the main surface of the second semiconductor wafer, which is connected to the first semiconductor wafer via the intermediate layer, has applied thereto a second intermediate layer prior to the connecting step.

3. A method according to claim 2, wherein the second intermediate layer is structured in such a way that, after the connecting step, the structure formed in the second intermediate layer and the recess in the first intermediate layer define the cavity.

4. A method according to claim 1, wherein a cavity with areas of variable height is produced due to the use of a plurality of intermediate layers.

5. A method according to claim 1, wherein the first and the second wafer consist of silicon.

6. A method according to claim 1, wherein said intermediate layer consists of an oxide, a polysilicon, a nitride or of metal.

7. A method according to claim 1, wherein the connection in step b) is carried out in a vacuum.

8. A method according to claim 1, wherein an SOI wafer is used as a first and/or second wafer.

9. A method according to claim 1, wherein said at least one defined opening is produced in the diaphragm-like structure by means of a needle, a blade, by the use of a pulsed laser radiation or by etching.

10. A method according to claim 1, wherein the channel is structured in the fashion of a labyrinth in step a) in such a way that disturbing products formed during the production of the opening are prevented from passing said channel.

* * * * *